US012194658B2

(12) United States Patent
Whitaker et al.

(10) Patent No.: US 12,194,658 B2
(45) Date of Patent: Jan. 14, 2025

(54) CONVERTING RECYCLABLE MATERIALS INTO MANUFACTURING PRODUCTS

(71) Applicant: CONTINUUS MATERIALS INTELLECTUAL PROPERTY, LLC, The Woodlands, TX (US)

(72) Inventors: Randal Whitaker, Houston, TX (US); Carl V. Rush, Jr., Houston, TX (US); Richard Toberman, Houston, TX (US); Allan Bradshaw, Bonney Lake, WA (US); Jack Winterowd, Puyallup, WA (US); Marko Suput, Lompoc, CA (US); Matthew Spencer, Palatine, IL (US); Jan Rayman, Des Moines, IA (US); Dean DeRaad, Ankeny, IA (US); Marc Lower, Oceanport, NJ (US); Richard Cochrane, Cocoa, FL (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 520 days.

(21) Appl. No.: 16/761,720

(22) PCT Filed: Nov. 7, 2018

(86) PCT No.: PCT/US2018/059545
§ 371 (c)(1),
(2) Date: May 5, 2020

(87) PCT Pub. No.: WO2019/094411
PCT Pub. Date: May 16, 2019

(65) Prior Publication Data
US 2020/0338789 A1 Oct. 29, 2020

Related U.S. Application Data

(60) Provisional application No. 62/583,036, filed on Nov. 8, 2017, provisional application No. 62/583,038, filed on Nov. 8, 2017.

(51) Int. Cl.
*B29B 17/00* (2006.01)
*B02C 23/00* (2006.01)
(Continued)

(52) U.S. Cl.
CPC ......... *B29B 17/0042* (2013.01); *B02C 23/08* (2013.01); *B03C 1/30* (2013.01);
(Continued)

(58) Field of Classification Search
CPC ................................................. B29K 2105/26
See application file for complete search history.

(56) References Cited

U.S. PATENT DOCUMENTS 4,044,695 A * 8/1977 Mackenzie ............... B07B 9/02
110/106
5,407,817 A * 4/1995 Lightsey ................... B09B 3/00
435/165
(Continued)

FOREIGN PATENT DOCUMENTS

WO WO-2016/128994 8/2016

OTHER PUBLICATIONS

"Changing the Properties of Particles to Control Their Rheology." AZoM.Com, Aug. 21, 2015, www.azom.com/article.aspx?ArticleID=12304#.Malvern Panalytical. "Changing the Properties of Particles to Control Their Rheology." AZoM.Com, Aug. 21, 2015, www.azom.com/article.aspx?ArticleID=12 (Year: 2015).*
(Continued)

*Primary Examiner* — Alison L Hindenlang
*Assistant Examiner* — Andres E. Behrens, Jr.
(74) *Attorney, Agent, or Firm* — Foley & Lardner LLP (57) ABSTRACT

A method of processing municipal solid waste includes extracting food waste, inert materials, and ferrous and non-ferrous metals from the municipal solid waste, shredding the municipal solid waste and thereby generating a
(Continued)

product feed comprising at least 99.7% by volume cellulose-based materials and plastic. The product feed is conveyed to a forming system and a manufacturing product is created out of the product feed with the forming system.

23 Claims, 2 Drawing Sheets (51) Int. Cl.
| | |
|---|---|
| *B02C 23/08* | (2006.01) |
| *B03C 1/00* | (2006.01) |
| *B03C 1/20* | (2006.01) |
| *B03C 1/30* | (2006.01) |
| *B09B 3/00* | (2022.01) |
| *B09B 3/21* | (2022.01) |
| *B29B 17/02* | (2006.01) |
| *B29B 17/04* | (2006.01) |
| *C08L 1/00* | (2006.01) |
| *C08L 1/08* | (2006.01) |
| *B29K 105/26* | (2006.01) |

(52) U.S. Cl.
CPC ............... *B09B 3/21* (2022.01); *B29B 17/02* (2013.01); *B29B 17/0412* (2013.01); *C08L 1/08* (2013.01); *B03C 2201/20* (2013.01); *B29B 2017/0272* (2013.01); *B29K 2105/26* (2013.01); *C08L 2207/20* (2013.01)

(56) References Cited

U.S. PATENT DOCUMENTS

| | | | | |
|---|---|---|---|---|
| 5,435,954 | A * | 7/1995 | Wold | B27N 5/00 |
| | | | | 428/903.3 |
| 8,444,897 | B2 * | 5/2013 | Reaveley | B29B 17/0026 |
| | | | | 44/589 |
| 9,126,204 | B1 | 9/2015 | Toberman et al. | |
| 9,765,269 | B2 * | 9/2017 | Bohlig | C22B 1/24 |
| 9,884,324 | B2 * | 2/2018 | Gitschel | B02C 23/14 |
| 10,400,188 | B2 * | 9/2019 | Toberman | B07B 15/00 |
| 10,538,716 | B1 | 1/2020 | Toberman et al. | |
| 10,793,798 | B2 | 2/2020 | Toberman et al. | |
| 11,514,408 | B2 * | 11/2022 | Cochrane | B09B 3/00 |
| 2003/0141623 | A1 * | 7/2003 | Khait | B29C 48/535 |
| | | | | 264/211.21 |
| 2006/0006564 | A1 | 1/2006 | Maldas et al. | |
| 2010/0144905 | A1 * | 6/2010 | Reaveley | C10G 2/32 |
| | | | | 44/589 |
| 2014/0209514 | A1 * | 7/2014 | Gitschel | B07B 4/02 |
| | | | | 209/3.1 |
| 2017/0130958 | A1 * | 5/2017 | Jennissen | F23G 5/08 |
| 2021/0390518 | A1 * | 12/2021 | Cochrane | B07C 5/344 |
| 2023/0173713 | A1 * | 6/2023 | Fisher | B29C 43/003 |
| | | | | 264/331.11 |

OTHER PUBLICATIONS

"Densifiers and Recycling." Waste Care, Sep. 11, 2017, web.archive.org/web/20170911103833/http://www.wastecare.com/Products-Services/Densifiers/Densifiers-Guide.htm. (Year: 2017).*

"Aseptic Processing—Wikipedia." Wikipedia, Nov. 14, 2016, web.archive.org/web/20161114011347/https://en.wikipedia.org/wiki/Aseptic_processing. (Year: 2016).*

"Variance Waste Disposal." The North Dakota Department of Health, 2009, deq.nd.gov/publications/wm/guideline22inertwastedisposalvariance.pdf. (Year: 2009).*

"Composite Material—Wikipedia." Wikipedia, Wikipedia, Jul. 21, 2017, web.archive.org/web/20170721165702/https://en.wikipedia.org/wiki/Composite_material. (Year: 2017).*

"Engineering Plastic—Wikipedia." Wikipedia, Nov. 22, 2016, web.archive.org/web/20161122072043/https://en.wikipedia.org/wiki/Engineering_plastic. (Year: 2016).*

International Search Report and Written Opinion for International Patent Application No. PCT/US2018/059545 dated Jun. 24, 2019, 12 pages.

* cited by examiner

CONVERTING RECYCLABLE MATERIALS INTO MANUFACTURING PRODUCTS

CROSS REFERENCE TO RELATED APPLICATION

This application is a National Stage Entry of, claims priority to, and claims the benefit of International Patent Cooperation Treaty (PCT) Application Serial No. PCT/US2018/059545entitled "Converting Recyclable Materials Into Manufacturing Products," filed on Nov. 7, 2018, which claims priority to and the benefit of U.S. Provisional Patent Application Ser. No. 62/583,036, filed on Nov. 8, 2017 and U.S. Provisional Patent Application Ser. No. 62/583,038, filed on Nov. 8, 2017, which are incorporated herein by reference in their entireties for any purpose.

BACKGROUND

Effective and environmentally sound waste disposal is a common dilemma faced by most industrialized and developing nations. In recent history, waste has primarily been disposed of in landfills, which require substantial tracts of land that might otherwise be used for other meaningful purposes. Regulatory and political bodies, as well as generators of waste, are increasingly interested in reducing waste volumes, diverting waste from landfills and incinerators while promoting more sustainable usage of waste products. Unfortunately, despite efforts of governments and communities to institute and promote waste recycling programs, there remains a tremendous amount of recyclable material that is not recycled.

There is a very critical need to utilize this vast resource and at the same time save the land now occupied as landfill space. It is therefore desirable to develop technologies that not only reduce the amount of waste destined for a landfill or incinerator, but also to capture and use such material for beneficial purposes.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to processing recyclable materials and, more particularly, to a system and method of converting recyclable materials, including municipal solid waste, into useful construction and/or manufacturing products.

The embodiments described herein are directed to receiving and processing recyclable materials into marketable construction or manufacturing products, and thereby advantageously diverting such materials from landfills or incinerators. In some embodiments, the recyclable material feedstock used in the presently disclosed systems and methods may comprise "pure recyclable materials," which may include post-consumer (e.g., residential/household) and/or post-industrial or "commercial" recyclables. Post-consumer recyclables include, but are not limited to consists of cellulose-based materials (e.g., newsprint, office paper, mail, magazines, cardboard, etc.), mixed plastics generated in the household (e.g., milk containers, detergent containers, water bottles, food trays, etc.), metals (e.g., aluminum cans, tin cans, other metals, etc.), and glass (e.g., bottles, etc.). Commercial recyclables include, but are not limited to, cellulose-based materials (e.g., large cardboard boxes, office paper, newsprint, etc.), film plastics, food court recyclables, glass, etc., all collected primarily from commercial businesses. The pure recyclable materials may be derived from commercial recycling facilities (e.g., processing centers), for example. In some applications, the pure recyclable materials may include rejected recyclable waste unable to be sold or consumed elsewhere.

In other embodiments, the recyclable material feedstock used in the presently disclosed systems and methods may comprise municipal solid waste (alternately referred to as "MSW"). As used herein, the term "municipal solid waste" refers to residential or commercial waste streams such as garbage/rubbish consisting of everyday items that are discarded by the public, food waste, non-recyclable plastics, packaging, yard waste, etc. MSW can include, but is not limited to, heavy weight materials (e.g., aggregates, glass, textiles, rubber, etc.), medium weight materials (e.g., fibers and rigid plastics), plastics, ferrous and non-ferrous metals, inert materials and residue (e.g., sand, rock, concrete, etc.), organic materials (e.g., food waste), very heavy and/or bulky materials, and any combination thereof. As used herein, the term "fibers" refers to paper, cardboard, and other cellulose-based materials, the term "plastics" refers to rigid plastics, foam plastics, film plastics, PVC plastics, and like materials. MSW does not generally contain medical waste, radioactive waste, hazardous waste, agricultural waste or sewer sludge.

A "manufacturing product," as used herein, refers to an output article resulting from the presently disclosed methods and systems. More specifically, the "manufacturing product" can comprise a two-dimensional (i.e., flat) or three-dimensional article that may be used, incorporated, or otherwise included, in a variety of construction, fabrication, packaging, and manufacturing products. In some embodiments, for example, the manufacturing product can comprise flat or planar sheets of material manufactured to any desired thickness. In such embodiments, the manufacturing product might be used as a type of drywall, wallboard, construction sheeting (e.g., roofing board), exterior or interior sheathing, paper, cardboard, signage, or any other type of generally planar fabricated creation. Alternatively, the manufacturing product can be manipulated, folded, bent, or otherwise formed to make a three-dimensional product, such as boxes (e.g., shoeboxes, cereal boxes, etc.), shipping containers, or any product that might otherwise be made of cardboard or the like. In yet other embodiments, the manufacturing product may be contoured and otherwise formed to any shape and nonetheless retain rigid or semi-rigid properties, such as furniture or another type of construction product.

Figure 1:
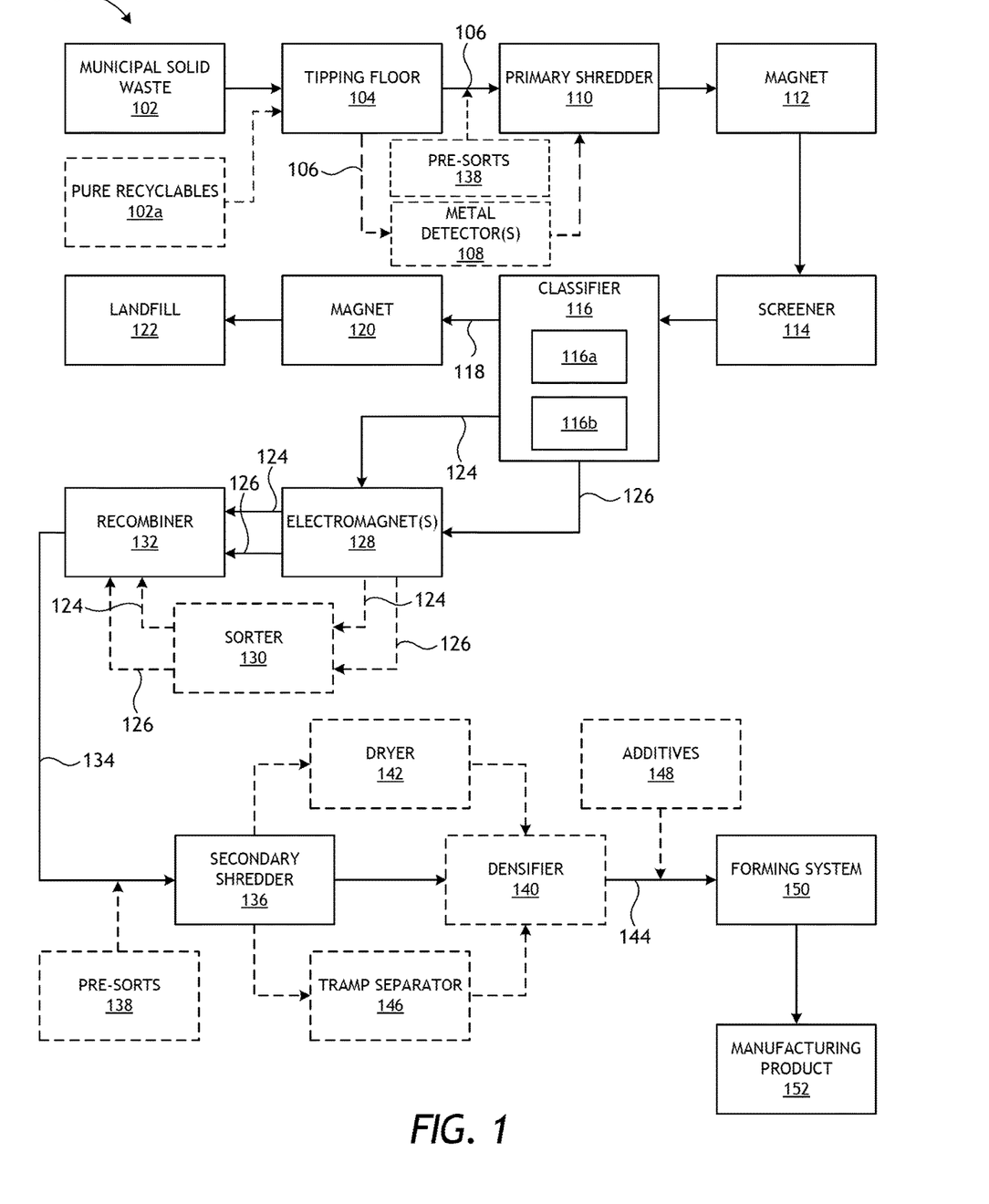
FIG. 1 is a schematic flow chart diagram of an example waste processing plant that may incorporate the principles of the present disclosure.

FIG. 1 is a schematic flow chart diagram representative of an example waste processing system 100 that may incorporate the principles of the present disclosure. The waste processing system 100 (hereafter the "system 100") includes various pieces of equipment and machinery capable of receiving a recyclable material feedstock and processing the recyclable material feedstock in a multi-step, mechanically engineered process to prepare a manufacturing product. In the illustrated embodiment, the system 100 may be configured to receive and process municipal solid waste 102 into a manufacturing product. In other embodiments, however, the system 100 may be used or otherwise modified to receive and process pure recyclable materials 102a, without departing from the scope of the disclosure. In such embodiments, as will be appreciated, some of the equipment described herein may not be necessary to provide suitable feedstock to make the manufacturing product.

In some embodiments, all of the pieces of equipment and processing systems of the system 100 may be located at a single location, such as a waste processing facility or plant. In other embodiments, however, some of the pieces of equipment and/or processing systems may be located at different locations. In such embodiments, a stream of material processed at one location may be transported to another location for further processing. It should be noted that numerous arrangements of the various equipment, stages, and techniques of the system 100 might be incorporated without departing from the scope of the disclosure. Indeed, not all equipment, stages, or techniques described herein need to be utilized in all embodiments.

In some embodiments, the resulting engineered manufacturing product derived or produced from the system 100 can consist of 99% or greater post-recycle fibers (e.g., cellulose-based materials) and plastics. In at least one embodiment, the manufacturing product may comprise at least 99.7% post-recycle fibers and plastic. In some embodiments, the manufacturing product may comprise 50% fibers and 50% plastic, +/−5%. In other words, the manufacturing product may consist of about 45-55% cellulose-based materials and about 45-55% plastic. In other embodiments, the manufacturing product may comprise 60% fibers and 40% plastic, +/−5%. In other words, the manufacturing product may consist of about 55-65% cellulose-based materials and about 35-45% plastic. As used herein, "%" refers to volume percent unless otherwise specifically indicated.

As illustrated, the system 100 may include a tipping floor 104. In-bound solid waste collection vehicles may discharge loads of the municipal solid waste 102 on the tipping floor 104 for presorting. The primary feedstock for discharge on the tipping floor 104 is non-hazardous secondary material derived from municipal solid waste otherwise bound for a landfill or an incinerator. In some embodiments, the municipal solid waste 102 may have undergone some preliminary source separation by households or businesses to extract recyclables collected and processed through local recycling programs where implemented. Moreover, in at least one embodiment, the primary feedstock of the municipal solid waste 102 may be augmented with commercial and industrial secondary material streams, such as hard-to-recycle plastics including, but not limited to, film plastic (low density polyethylene), colored high density polyethylene containers (e.g., laundry detergent containers), polyvinyl chloride (PVC) plastics, polystyrene, polypropylene, and acrylonitrile butadiene styrene (ABS) plastics.

The municipal solid waste 102 can be presorted on the tipping floor 104 to remove very heavy and/or bulky materials, such as tires, mattresses, post-consumer carpet, etc., that may be unsuitable for the manufacturing product. Large ferrous and non-ferrous metals can also be extracted from the municipal solid waste 102 on the tipping floor 104 and may be set aside as rejected materials. Readily identifiable, high quality, and safely accessible recyclable fibers and plastics may be removed, such as by using excavators and wheel loaders. The remaining raw materials of the municipal solid waste 102 comprise a treatable municipal solid waste stream 106 that can then proceed through the processing equipment of the system 100. In at least one embodiment, the system 100 may be capable of capturing about 50-55% of the total, raw in-bound material stream for production of the engineered manufacturing product. As will be appreciated, this percentage would be higher if the incoming feedstock included primarily recycling streams.

After presorting on the tipping floor 104, the treatable municipal solid waste stream 106 may be fed onto a conveyor belt that mechanically conveys the stream 106 away from the tipping floor 104. While not expressly shown or described, conveyor belts (or similar conveyance means) may be used to convey the treatable municipal solid waste stream 106 to and/or through some or all of the component equipment of the system 100. In some embodiments, the treatable municipal solid waste stream 106 may optionally be conveyed from the tipping floor 104 through one or more metal detectors 108. The metal detectors 108 may be configured to detect large metallic items, such as propane tanks and other large metallic or dense items that may be included in the municipal solid waste 102. Such large metal objects may be ejected or otherwise removed from the municipal solid waste stream 106. In other embodiments, however, the metal detector(s) 108 may be omitted from the system 100, without departing from the scope of the disclosure.

The treatable municipal solid waste stream 106 may then undergo a pre-shredding process in a primary shredder 110. Pre-shredding the treatable municipal solid waste stream 106 will break up the materials to produce a homogeneous material suitable for further processing. The primary shredder 110 may be configured to reduce the treatable municipal solid waste stream 106 to a more manageable size, which helps homogenize and volumetrically expand the raw materials therein. In at least one embodiment, the primary shredder 110 may be capable of reducing the materials in the treatable municipal solid waste stream 106 to 10 inch (254 mm) minus dimensional (particle) size. As discussed below, further shredding may reduce the particle size to about 0.75 inch (approx. 20 mm) minus dimensional size.

The pre-shredded municipal solid waste may then be conveyed past an over-belt magnet 112 configured to extract ferrous materials. The over-belt magnet 112 may be positioned over the conveyor that transports the treatable municipal solid waste stream 106. In one or more embodiments, one or more additional over-belt magnets may be positioned at various locations throughout the system 100 to extract remaining ferrous metals in the treatable municipal solid waste stream 106 and thereby maximize ferrous metal recovery. All ferrous metals extracted from the treatable municipal solid waste stream 106 may be recycled.

The treatable municipal solid waste stream 106 may then undergo screening via a screener 114 configured to extract organic materials. A substantial portion of the extracted organic materials may comprise food waste, for example. All or substantially all of the organic material can be extracted via the screener 114 and subsequently composted and/or used in anaerobic digestion to generate biogas for combustion. In some embodiments, the screener 114 (alternately referred to as a "waste screen") may comprise a multi-tiered vibrating deck unit designed to screen out materials that are less than 2 inch (approx. 50 mm) particle size. Materials that may be screened out include, but are not limited to, food waste, aggregates, E-waste (batteries), glass, etc.

The treatable municipal solid waste stream 106 may then be conveyed to a multi-step air classifier 116 configured to separate the raw materials in the municipal solid waste stream 106 by weight density and thereby produce a plurality of distinct streams. More specifically, the multi-step air classifier 116 may include a first section 116a designed to separate out heavy weight materials 118 from the municipal solid waste stream 106, which may primarily comprise inert waste unsuitable for the manufacturing product. The first section 116a may be capable of removing all or substantially all of the heavy weight materials 118 from the municipal solid waste stream 106, which may comprise about 25-30% of the municipal solid waste 102. After passing under an over-belt magnet 120 to extract remaining ferrous metals, the stream of heavy weight materials 118 may be disposed of in a landfill 122.

The remaining portion of the municipal solid waste stream 106 may then be conveyed to a second section 116b of the multi-step air classifier 116. The second section 116b may be designed to separate medium weight materials 124 from light weight materials 126 and thereby form two distinct streams. While only two streams 124, 126 are depicted, it is contemplated herein that additional streams of medium or light weight materials might also be formed. In certain embodiments, the medium weight materials 124 may represent around 50-55% of the raw-in bound material mass balance.

Separation within each section 116a,b of the multi-step air classifier 116 can be performed by weight density based on air flows, residence times, and/or material recirculation. In some embodiments, equipment operators can select materials for recirculation and can move materials between sections 116a,b to control the materials that ultimately exit the air classifier 116. In addition, controlled particulate matter air scrubbers (not shown) can be used in the air classifier 116 to eliminate dust within the negative-air controlled confines of the system 100.

Following discharge from the multi-step air classifier 116, the medium and light weight material streams 124, 126 may then be exposed to one or more electromagnets 128 (e.g., eddy currents) to help remove non-ferrous metals from each stream 124, 126. The non-ferrous metals extracted using the electromagnets 128 may be collected for recycling, if desired.

In some embodiments, the medium and light weight material streams 124, 126 may optionally be conveyed to a sorter 130 designed to identify and eject polyvinyl chloride (PVC) plastic materials, which exhibit high chlorine content. In such embodiments, the sorter 130 may comprise a near infrared (NIR) spectroscopic and/or hyperspectral imaging (HSI) system. In certain embodiments, such as where the manufacturing product might be used as a fuel, chlorine removal may be critical in altering the chemical composition of the fuel and thereby improve fuel characteristics and performance.

In some embodiments, the sorter 130 may further be configured to provide granular data on plastic content by resin type and percentage, as well as by biogenic fiber components. The sorter 130 may be designed to record up to 27 million detections per second at a 320 pixel resolution, and may have the ability to create a data log of all engineered fuel material components in the medium and light weight material streams 124, 126 by material percentage; i.e., biogenic fiber and plastic.

The sorter 130 may also be programmed to identify and eject metallic materials not extracted by over-belt magnets (e.g., magnets 112) or eddy currents (e.g. electromagnet 128). More specifically, the sorter 130 may be configured to detect the light reflected from the objects onto highly sensitive NIR sensors and, in some embodiments, may be capable of detecting objects as small as one-half inch in size. The sorter 130 may be able to identify and pinpoint the location of particular objects present in the medium weight material stream 118 or the light weight material stream 120. A precise puff of air from one or more nozzles associated with the sorter 130 can eject any undesirable materials before the medium and light weight material streams 124, 126 are discharged from the sorter 130.

It is contemplated herein that equipment similar to the sorter 130 may also be utilized in various other locations in the system 100. For example, an NIR scanner may be incorporated prior to the primary shredder 110, prior to the screener 114, prior to and/or following the multi-step air classifier 116, and/or at other points in the system 100 system. Such NIR scanners may help detect moisture in the municipal solid waste, and the data recorded by the NIR scanners can be used to either increase or reduce the process flow rate. For example, when the process flow rate is reduced, more moisture laden material can be extracted from the municipal solid waste, preferably at an early stage of the system 100 to promote more efficient separation of heavy weight materials 118, medium weight materials 124, and light weight materials 126. The NIR scanners may also be used to detect moisture in the municipal solid waste 102 at later stages in the system 100 to control the moisture content of the manufacturing product.

After passing through the electromagnet(s) 128 (or optionally following processing in the sorter 130), the medium and light weight material streams 124, 126 may be proportionately recombined in a recombiner 132. In some embodiments, the mix of the medium and light weight material streams 124, 126 may produce a recombined stream 134 that is approximately 50% fiber and 50% plastic (e.g., +/−5%). The recombined stream 134 may then be conveyed to a secondary shredder 136.

In some embodiments, prior to entering the secondary shredder 136, the recombined stream 134 may be "fine-tuned" through the addition of known materials. More specifically, a stream of pre-sorted materials 138 may optionally be added in proportion to the recombined stream 134 either within or following the recombiner 132 and thereby produce a "fine-tuned" recombined stream 134. The pre-sorted materials 138 are selected clean recyclable materials known as "pre-sorts" that comprise streams of clean recyclable fibers (e.g., cellulose-based materials) and/or clean recyclable plastics. The pre-sorted materials 138 may exhibit known properties that will produce desired structural properties in the manufacturing product. With the addition of the pre-sorted materials 138, the fine-tuned recombined stream 134 can be used to produce a manufacturing product that meets customer specifications for various desired features.

Suitable plastic pre-sorts, for example, include, but are not limited to, polyethylene, polypropylene, and polystyrene plastics, such as post-industrial waste like polypropylene automobile carpet trims and/or polyethylene food wrappers. Suitable fiber pre-sorts include, but are not limited to, mixed papers, old newsprint, and cardboard.

The pre-sorted materials 138 may be stored separately from any inbound municipal solid waste coming in the system 100 and may be added to the recombined stream 134 at a metered rate. In some embodiments, the pre-sorted materials 138 can be added to the municipal solid waste stream 106 at other locations in the system 100, or in addition to the recombined stream 134. For example, the pre-sorted materials 138 may be added to the municipal solid waste stream 106 prior to the primary shredder 110, and/or prior to the multi-step air classifier 116. In some embodiments, adding the pre-sorted materials 138 to the municipal solid waste stream 106 early in the process may reduce the moisture percentage in the municipal solid waste 102 and promote more efficient separation of heavy weight materials, medium weight materials, and light weight materials.

The recombined stream 134 may then undergo additional shredding and/or granulation in the secondary shredder 136, which may comprise a high-speed shredder. The purpose of this additional shredding is to produce a particle size that can easily pass through the subsequent processing steps without causing plugging of the machinery. In some embodiments, for example, the secondary shredder 136 may shred the recombined stream 134 to a particle size of 2 inches (approx. 50 mm) or less. In other embodiments, the secondary shredder 136 may shred the recombined stream 134 to a particle size of 0.75 inches (approx. 20 mm) or less. In at least one embodiment, the recombined stream 134 may be repeatedly cycled through the secondary shredder 136 (or another shredder) until granulated to a particle size of about 0.025 inches (approx. 0.6 mm). As will be appreciated, the type of manufacturing product that can be produced may depend on particle size, and smaller particle sizes may prove advantageous in producing thinner and/or stiffer manufacturing products.

Following the secondary shredder 136, in some embodiments, the recombined stream 134 may be conveyed to a densifier 140 for densification, but densification may not be necessary or desired. Optionally, it may be desired to dry the contents of the recombined stream 134 prior to densification. In such embodiments, the recombined stream 134 may optionally be staged and dried in a dryer 142 and subsequently processed in the densifier 140. In embodiments where the dryer 142 and the densifier 140 are used, the dryer 142 may be configured to dry the recombined stream 134 to approximately 15% moisture content, and in at least one embodiment, the recombined stream 134 may be dried to approximately 5% moisture content. During densification, the densifier 140 will typically release approximately 5% moisture in the form of steam, thus yielding a product feed 144 with a moisture content of approximately 10%.

Alternatively, the recombined stream 134 may simply be dried in the dryer 142, without passing through the densifier 140. In such embodiments, the moisture content can be reduced to about 5%, which may be achieved utilizing the dryer 142 by itself and/or by adding dry pre-sorts (e.g., the pre-sorted materials 138) to the municipal solid waste stream 106 at various stages of the process.

In one or more embodiments, the recombined stream 134 may optionally be conveyed through a tramp separator 146 prior to being received by the densifier 140. The tramp separator 146 may be configured to undertake an additional (final) extraction step that ensures elimination of "tramp metals," which refers to ferrous or non-ferrous metals and inert fines of 1-inch or less that have not already been removed and that might damage subsequent equipment in the system 100. Following the optional tramp separator 146, the composition of the process recombined stream 134 may be 99% or greater post-recycle fibers and plastic. In at least one embodiment, the recombined stream 134 may sequentially pass through the dryer 142 and the tramp separator 146 prior to being processed in the densifier 140.

In some embodiments, the product feed 144 may comprise approximately 99.7% fiber (e.g., cellulose-based materials, such as paper, cardboard, etc.) and plastic as discharged from the densifier 140. Moreover, in at least one embodiment, the product feed 144 may comprise approximately 50% fiber and approximately 50% plastic, +/−5%. In other words, the product feed 144 include about 45-55% cellulose-based materials and about 45-55% plastic. In other embodiments, as mentioned above, the product feed 144 may comprise about 60% fibers and about 40% plastic, +/−5%. In other words, the product feed 144 may consist of about 55-65% cellulose-based materials and about 35-45% plastics.

In some embodiments, various additives 148 may optionally be included in or otherwise added to the product feed 144. Example, additives 148 include, but are not limited to, a flame retardant, a water repellant, a bonding agent (e.g., an adhesive), or any combination thereof.

The product feed 144 may be conveyed to a forming system 150 operable to generate or otherwise produce a manufacturing product 152 from the product feed 144. The forming system 150 may include or otherwise comprise a variety of dies and presses configured to convert the product feed 144 into the manufacturing product 152. The forming system 150 may be capable of generating (fabricating) the manufacturing product 152 to any desired shape or size, and exhibiting a variety of desirable characteristics (i.e., hardness, durability, flammability, etc.). Moreover, depending on the type(s) of additives 148 added to the product feed 144, the manufacturing product 152 may exhibit physical properties such as, but not limited to, fire resistant, hydrophobic, impact resistant, mold resistant, or any combination thereof.

In at least one embodiment, the forming system 150 may include one or more hydraulic or pneumatic presses configured to form the manufacturing product 152 via pressing or stamping. The press(es) may include, for example, opposing flat platens, which may further include opposing mold halves mounted thereto to mold the manufacturing product into a two-dimensional (e.g., flat) or three-dimensional geometric shape, such as by compression molding. The amount of pressure applied by the press(es) may range between about 10 psi and about 200 psi. In at least one embodiment, the press(es) may have the capacity to exert up to 150 psi (specific pressure) evenly across the mat area.

In some applications, operation of the press(es) may cause the temperature of the product feed 144 to increase, which may melt the plastic particles and particulates present within the mass. As a result, the plastic constituent may flow and serve as a bonding agent that binds the material in a rigid or semi-rigid form. In some embodiments, however, an additional bonding agent (e.g., an adhesive or the like) may be added to help bind the material, such as being included as one of the additives 148 to the product feed 144.

In some embodiments, the forming system 150 may include or otherwise incorporate one or more heaters or heating devices configured to apply thermal energy (i.e., heat) to the product feed 144 to help melt the plastic. In at least one embodiment, an electric heater may be used to generate the necessary thermal energy, but other types of heaters or heating devices may be used, without departing from the scope of the disclosure. The thermal energy may be applied continuously or intermittently to increase the temperature of the product feed 144 to a temperature ranging between about 200° F. and about 350° F., or greater than 350° F. In at least one embodiment, the thermal energy may be applied to the product feed 144 prior to entering the forming system 150, but may alternatively be applied to the product feed 144 while compressed within the press(es) of the forming system 150. The thermal energy, coupled with the force of the press(es), causes the plastic constituent in the product feed 144 to flow into the network of interstices of the remaining material (e.g., fiber) to form the rigid or semi-rigid manufacturing product 152.

Manufacturing products 152 made in accordance with the present disclosure may exhibit many advantageous physical properties. For example, the manufacturing product 152 may exhibit a compressive strength of about 3990 psi (nominal). The manufacturing product 152 may also be fire resistant in accordance with international standards meeting ASTM E108 and UL790. The manufacturing product 152 may also have a permeance of less than 1, in accordance with ASTM E96. The manufacturing product 152 may exhibit a mold resistance factor of 10, in accordance with ASTM E96. The manufacturing product 152 may also be non-toxic and thereby give off zero volatile organic compounds (VOCs).

As noted above, while the foregoing description discusses receiving the municipal solid waste 102 as the base input (i.e., main feedstock) into the system 100, as indicated above, it is also contemplated herein to use only clean or "pure" recyclable materials as the base input into the system 100 to make the manufacturing product. In such embodiments, several of the components of the system 100 may not be required such as, but not limited to, the sorter 130 and its associated NIR/HSI scanners, and the densifier 140. The pure recyclable material may be obtained from a recycling plant (processing facility), for example, and may comprise all or substantially all plastics and cellulose-based materials.

Figure 2:
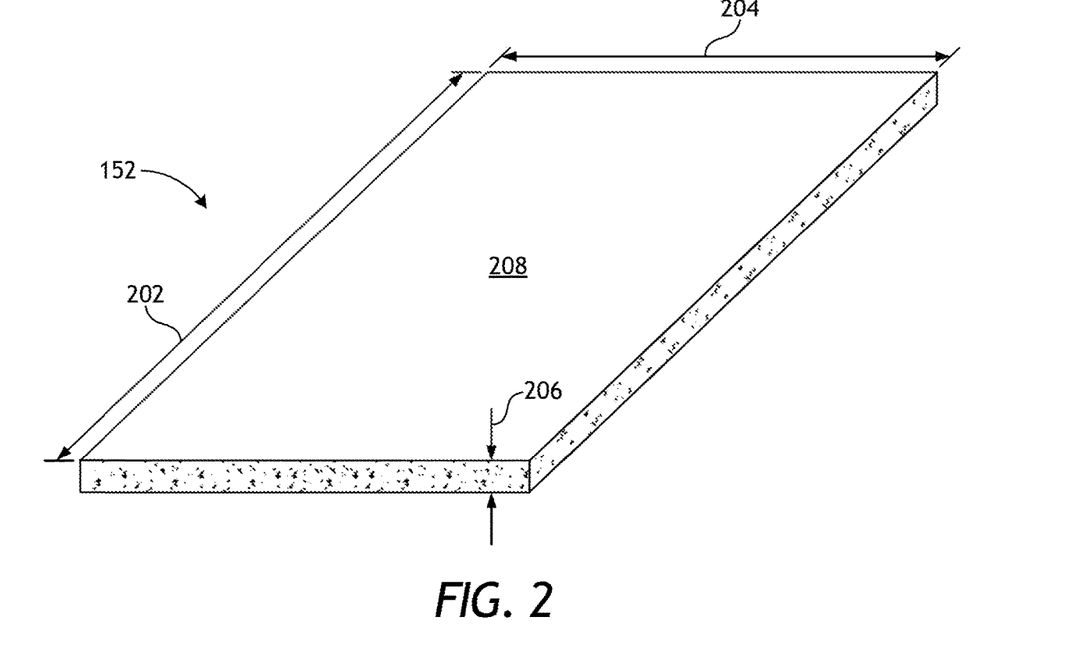
FIG. 2 is an isometric view of an example manufacturing product, according to one or more embodiments.

FIG. 2 is an isometric view of an example manufacturing product 152, according to one or more embodiments. In the illustrated embodiment, the manufacturing product 152 may comprise a generally planar (flat) article that may be used in a variety of applications. The manufacturing product 152 may be used as, but not limited to, paper, cardboard, drywall, wallboard, construction sheeting (e.g., a roof board), exterior or interior sheathing, paper, cardboard, or any combination thereof.

As illustrated, the manufacturing product 152 may exhibit a length 202, a width 204, and a depth 206. The only limitations on the specific dimensions for the length 202, the width 204, and the depth 206 would be dependent on the limitations of the forming system 150 (FIG. 1). Accordingly, the length 202, the width 204, and the depth 206 may exhibit any desired dimensions capable of being generated by the forming system 150. In some embodiments, however, the dimensions of the manufacturing product 152 may match those of common construction materials. Accordingly, in at least one embodiment, the length 202 may be 8 feet, the width 204 may be 4 feet, and the depth 206 may be ¼ inch, ½ inch, ⅜ inch, ⅝ inch, etc. In such embodiments, the manufacturing product 152 may be used as drywall, wallboard, a roofing board, construction sheeting, exterior or interior sheathing, etc.

In some embodiments, a veneer or covering 208 may be applied to one or more sides of the manufacturing product 152. In one or more embodiments, the covering 208 may be cosmetic in nature. In other embodiments, the covering 208 may be structural in nature and thereby enhance the rigidity of the manufacturing product 152. In yet other embodiments, the covering 208 may provide a surface for printing and otherwise displaying messages.

Landfill Offset Credits and Associated Market

Figure 3:
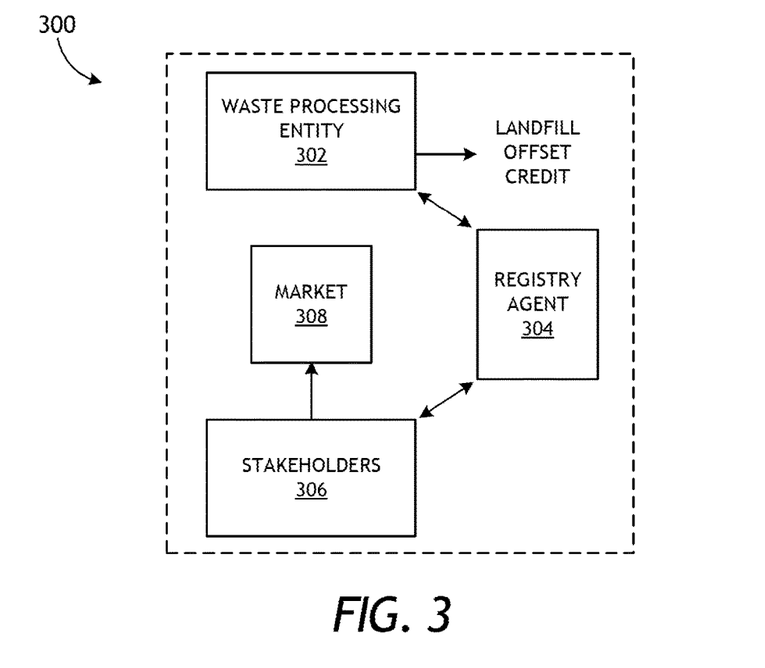
FIG. 3 is a schematic diagram of an example landfill offset credit market and system, according to one or more additional embodiments of the present disclosure.

FIG. 3 is a schematic diagram of an example landfill offset credit market and system 300, according to one or more additional embodiments of the present disclosure. The landfill offset credit market and system 300 (hereafter the "system 300") provides the framework for and facilitates the monetization, trading, and tracking of landfill offset credits. As used herein, the term "landfill offset credits" (alternately referred to as "landfill diversion credits" or "landfill avoidance credits") refers to an environmental offset mechanism that can be utilized by organizations or individuals to achieve environmental sustainability goals. As described herein, the system 300 may provide an associated marketplace to manage the landfill offset credits.

As illustrated, the system 300 includes one or more waste processing entities 302, a registry agent 304, and one or more stakeholders 306. The waste processing entities 302 may be any organization, company, entity, or individual capable of receiving municipal solid waste and processing the municipal solid waste into a reusable form such that it does not reach a landfill (i.e., is reused in any form). Suitable reusable forms of the municipal solid waste include, but are not limited to, recycled material, fuel, mulch materials, compost materials, a chemical, and construction or manufacturing materials usable in any industry. In some embodiments, for example, a given waste processing entity 302 may implement a waste processing system similar to the system 100 of FIG. 1. In other embodiments, the waste processing entity 302 may be configured and otherwise capable of extracting or deriving various usable chemicals or sugars from the municipal solid waste.

The registry agent 304 may be a third party entity, such as a non-governmental entity, a jointly-operated industry advocacy group, or a similar entity. It may be desirable for the registry agent 304 to be an entity that has neutral business interests as compared to the waste processing entities 302 and the stakeholders 306. Consequently, the registry agent 304 may have sufficient authority to establish rules of operation of the system 300, enforce the rules of operation, maintain confidentiality of information, accept liability for the accuracy of the information received, and resolve disputes related to the system 300 regarding the waste processing entities 302 and the stakeholders 306. Moreover, the registry agent 304 may have responsibility for managing a computing environment on which the system 300 operates, and the registry agent 304 may have the expertise to develop reports regarding the performance of the system 300.

Landfill offset credits are created or generated by the waste processing entities 302, and each landfill offset credit must be certified by the registry agent 304. To be able to certify (verify) each landfill offset credit, the registry agent 304 may first be tasked with auditing (authorizing, qualifying, etc.) each waste processing entity 302 to ensure that incoming municipal solid waste received by a given waste processing entity 302 is processed according to predetermined processing parameters. The registry agent 304 may also ensure that the output of each waste processing entity 302 comprises a qualifying reusable form and is otherwise not destined for a landfill. In one example, each qualifying metric ton of municipal solid waste diverted from the landfill by a qualified waste processing entity 302 will generate one certified landfill offset credit. In other embodiments, any measureable or quantifiable amount of processed municipal solid waste may be used as a standard for each certified landfill offset credit.

Each certified landfill offset credit may be serialized by the registry agent 304 to enable accurate tracking of the certified landfill offset credits. Serializing the certified landfill offset credits may entail issuing a unique registry number and assigning that unique registry number to each certified landfill offset credit. A certified and serialized landfill offset credit may comprise a guarantee that the stipulated amount of municipal solid waste associated with the certified landfill offset credit is or has been appropriately converted into a reusable form not destined for a landfill.

Certified landfill offset credits can be purchased by the stakeholders 306, which may comprise any organization, company, entity, or individual desiring to achieve environmental sustainability goals. For example, some stakeholders 306 may have a goal to achieve zero percent (0%) landfill status (or any other percentile status). Declaring zero percent landfill status means that the organization does not collectively contribute to waste being disposed of in a landfill. To reach this goal, a given stakeholder 306 may implement internal waste recycling and conservation efforts. Despite these efforts, the stakeholder 306 may nonetheless generate waste that is inevitably destined for a landfill. In such cases, the stakeholder 306 can effectively achieve zero percent landfill status by purchasing an equivalent amount of certified landfill offset credits to offset the amount of waste the stakeholder 306 contributes to the landfill. Consequently, in their public sustainability reporting, the stakeholder 306 can report that they have achieved their goal of zero percent landfill status.

In some embodiments, purchasing a certified landfill offset credit may also entitle the stakeholder 306 to possession of the tangible reusable form, or vice versa. For example, some stakeholders 306 may desire to purchase recycled plastics or ferrous materials used for a particular manufacturing process. In such cases, the stakeholder 306 may purchase the processed reusable form generated by the waste processing entity 302, and may also be awarded with the certified landfill offset credit associated therewith. In at least one embodiment, purchasing and receiving the processed reusable form may require a premium (additional) purchase price.

The revenue derived from purchased certified landfill offset credits may be invested in new technologies and/or entities capable of generating new certified landfill offset credits. In some embodiments, for example, a portion of the revenue may be used to fund the waste processing entities 302 already generating landfill offset credits. In some cases, for instance, a given waste processing entity 302 may be economically challenged and a portion of the revenue may be used to maintain continued operation of the waste processing entity 302. In other embodiments, the registry agent 304 may use a portion of the revenue to fund or create new waste processing entities that use innovative or known waste processing means to generate additional landfill offset credits. Moreover, a portion of the revenue may be used to fund operation of the registry agent 304.

In some embodiments, a market 308 may be created to allow stakeholders 306 to negotiate the purchase and sale of landfill offset credits. More specifically, the market 308 provides stakeholders 306 with a platform or structure where certified landfill offset credits may be purchased, sold, traded, and/or retired. In some embodiments, the market 308 may be maintained and operated by the registry agent 304, but may alternatively be maintained and operated by a third party entity such as a non-governmental organization. The market 308 provides a transparent, electronic data exchange platform which operates to authorize, transmit, receive, match, confirm, report, clear, settle and otherwise execute buy and sell orders for the certified landfill offset credits.

The market 308 may be implemented as a software program that helps provide or facilitate a user interface that enables the execution of various functions. To accomplish this, the market 308 may incorporate hardware and/or software, such as computers, routers, servers, phone lines, and the like. Each stakeholder 306 may provide to the market 308 details needed or desired for the specific transaction seeking to be made. In some embodiments, each stakeholder 306 may have a data storage hardware device capable of communicating with the market 308 and including a software operative to facilitate transformational data protection via encryption. In one or more embodiments, the stakeholders 306 may also operate over a web-based Cloud network.

The registry agent 304 may be tasked with managing, intervening, and controlling accounts held by each stakeholder 306 and making adjustments to such accounts. Moreover, the registry agent 304 may facilitate the oversight of trading done using the market 308 for adherence to system rules. For example, the registry agent 304 may be configured to manage and record all market activities of the stakeholders 306, such as buying, selling, trading, or retiring a landfill offset credit. As used herein, a landfill offset credit is "retired" when its owner (i.e., a stakeholder 306) exhausts the value of the credit and thereby effectively takes the credit out of circulation. The value of a landfill offset credit can be exhausted by informing the registry agent 304 that the landfill offset credit is being used for reporting in a sustainability report or a type of environmental governmental reporting. When a landfill offset credit is retired, the registry agent 304 may then proceed to deactivate and decommission the associated unique registry number so that it cannot be used in conjunction with another landfill offset credit. Accordingly, the registry agent 304 may operate the market 308 to ensure that no landfill offset credits are inappropriately minted (certified) or retired.

The system 300 may prove advantageous in reducing the amount of municipal solid waste ending up in landfills and spurring technological advances in processes configured to convert municipal solid waste into a useful reusable form.

Computer hardware used to implement the various illustrative blocks, modules, elements, components, methods, and algorithms described herein with respect to the system 300 can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

In some embodiments, a landfill offset credit market and system may include a waste processing entity operable to generate landfill offset credits by receiving and processing municipal solid waste into a reusable form such that it does not reach a landfill. A registry agent may certify and serialize each landfill offset credit to ensure that the reusable form is not destined for a landfill and may further enable tracking of the certified landfill offset credits. The landfill offset credit market and system may also include one or more stakeholders that purchase, sell, trade, and retire the certified landfill offset credits.

The reusable form may be selected from the group consisting of recycled material, fuel, a mulch material, a compost material, a chemical, a construction or manufacturing material, or any combination thereof. In at least one embodiment, the reusable form may comprise a manufacturing product comprising a two-dimensional or three-dimensional construction or fabrication product. The registry agent may be a third party entity with neutral business interests as compared to the waste processing entity and the stakeholders. The registry agent may also audit the waste processing entity to ensure that incoming municipal solid waste received by the waste processing entity is processed according to predetermined processing parameters. A unique registry number may be assigned to each certified landfill offset credit. The stakeholders may purchase the certified landfill offset credits in order to achieve environmental sustainability goals, and purchasing a certified landfill offset credit may entitle a stakeholder to possession of a tangible reusable form associated with the certified landfill offset credit. At least a portion of the revenue derived from purchased certified landfill offset credits may be invested in new technologies and/or entities capable of generating new certified landfill offset credits.

The landfill offset credit market and system may further include a market where the stakeholders can purchase, sell, trade, and retire certified landfill diversion credits. The market may be maintained and operated by the registry agent.

In some embodiments, a method of reducing municipal solid waste destined for a landfill is disclosed and may include receiving the municipal solid waste at a waste processing entity, and processing the municipal solid waste into a reusable form at the waste processing entity and thereby generating landfill offset credits. The method may further include certifying each landfill offset credit with a registry agent and thereby ensuring that the reusable form is not destined for a landfill, and serializing each landfill offset credit with the registry agent to enable tracking of the certified landfill offset credits. The method may further include at least one of purchasing, selling, trading, and retiring the certified landfill offset credits with one or more stakeholders.

The method may further include auditing the waste processing entity with the registry agent to ensure that incoming municipal solid waste received by the waste processing entity is processed according to predetermined processing parameters. Serializing each landfill offset credit may include assigning a unique registry number to each certified landfill offset credit. The method may further include retiring one or more certified landfill offset credits by the one or more stakeholders to achieve an environmental sustainability goal of the one or more stakeholders. Purchasing a certified landfill offset credit further may include taking possession of a tangible reusable form associated with the certified landfill offset credit. The method may further include investing at least a portion of the revenue derived from purchased certified landfill offset credits in new technologies and/or entities capable of generating new certified landfill offset credits. The method may further include at least one of purchasing, selling, trading, and retiring the certified landfill diversion credits in a market accessible by the one or more stakeholders. The method may further include maintaining and operating the market with the registry agent.

Embodiments disclosed herein include:

A. A method of processing municipal solid waste that includes extracting food waste, inert materials, and ferrous and non-ferrous metals from the municipal solid waste, shredding the municipal solid waste and thereby generating a product feed comprising at least 99.7% by volume cellulose-based materials and plastic, conveying the product feed to a forming system, and creating a manufacturing product out of the product feed with the forming system.

B. A manufacturing product comprising a two-dimensional or three-dimensional article made from municipal solid waste that is processed to extract food waste, inert materials, and ferrous and non-ferrous metals and shredded to generate a product feed comprising at least 99.7% by volume cellulose-based materials and plastic, wherein the product feed is pressed in a forming system to form the two-dimensional or three-dimensional article.

C. A method of processing pure recyclable materials that includes receiving and shredding the pure recyclable materials and thereby generating a product feed comprising at least 99.7% by volume cellulose-based materials and plastic, conveying the product feed to a forming system, and creating a manufacturing product out of the product feed with the forming system.

Each of embodiments A, B, and C may have one or more of the following additional elements in any combination: Element 1: wherein the product feed comprises about 45-55% cellulose-based materials and about 45-55% plastic by volume. Element 2: wherein the product feed comprises about 55-65% cellulose-based materials and about 35-45% plastic by volume. Element 3: wherein creating the manufacturing product comprises pressing the product feed with one or more presses included in the forming system, and melting the plastic in the product feed and thereby binding the product feed in a rigid or semi rigid form of a two-dimensional article or a three-dimensional article. Element 4: wherein pressing the product feed with the one or more presses increases a temperature of the plastic and melts the plastic. Element 5: wherein melting the plastic in the product feed comprises heating the product feed as the product feed is pressed in the one or more presses. Element 6: further comprising applying a covering to one or more sides of the manufacturing product. Element 7: wherein creating the manufacturing product comprises adding a bonding agent to the product feed, and pressing the product feed with one or more presses included in the forming system and thereby binding the product feed in a rigid or semi rigid form of a two-dimensional article or a three-dimensional article. Element 8: further comprising adding pre-sorted materials to the municipal solid waste, the pre-sorted materials including recyclable cellulose-based materials and recyclable plastics. Element 9: wherein shredding the municipal solid waste comprises reducing a size of the municipal solid waste to a particle size of ten inches or less. Element 10: further comprising reducing the size of the municipal solid waste to a particle size of about 0.75 inches. Element 11: further comprising adding an additive to the product feed, the additive being selected from the group consisting of a flame retardant, a water repellant, a bonding agent, or any combination thereof. Element 12: wherein conveying the product feed to the forming system is preceded by drying the municipal solid waste in a dryer, and densifying the municipal solid waste in a densifier.

Element 13: wherein the two-dimensional or three-dimensional article exhibits a physical property selected from the group consisting of fire resistant, hydrophobic, impact resistant, mold resistant, and any combination thereof. Element 14: wherein the two-dimensional or three-dimensional article is selected from the group consisting of a flat or planar sheet, a box, a shipping container, furniture, signage, construction product, and any combination thereof. Element 15: wherein the product feed comprises about 45-55% cellulose-based materials and about 45-55% plastic by volume. Element 16: wherein the product feed comprises about 55-65% cellulose-based materials and about 35-45% plastic by volume. Element 17: wherein the plastic binds the product feed in a rigid or semi rigid form of the two-dimensional or three-dimensional article. Element 18: further comprising a covering applied to one or more sides of the two-dimensional or three-dimensional article.

Element 19: wherein the product feed comprises about 45-55% cellulose-based materials and about 45-55% plastic by volume. Element 20: wherein the product feed comprises about 55-65% cellulose-based materials and about 35-45% plastic by volume.

By way of non-limiting example, exemplary combinations applicable to A, B, and C include: Element 3 with Element 4; Element 3 with Element 5; Element 3 with Element 6; Element 3 with Element 7; Element 3 with Element 8; Element 3 with Element 9; Element 3 with Element 10; and Element 9 with Element 10.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method comprising: a first shredding step comprising shredding waste comprising a mixture of cellulosic materials, plastic, and other waste, the other waste comprising at least one of: organic materials including food waste, ferrous and non-ferrous metals, glass, textiles and other inert materials; wherein shredding comprises reducing a size of the waste to particle sizes ranging between 0.088 mm and 254 mm; adding pre-sorted cellulosic materials to the mixture prior to the first shredding step to reduce the moisture percentage of the mixture to less than 15%; sorting, separating, air classifying, and sizing the shredded waste; removing, from the waste shredded in the first shredding step, at least a portion of the other waste resulting in a blended mass of 70.0% to 99.7% cellulosic materials and plastic; a second shredding step comprising shredding the blended mass; and forming the shredded blended mass into a manufacturing product.

2. The method of claim 1, wherein the waste includes municipal solid waste, residuals from municipal recycling facilities, and post-industrial waste.

3. The method of claim 1, wherein the blended mass comprises substantially 0-90% cellulose-based materials and substantially 10-100% plastic by volume.

4. The method of claim 1, wherein forming the blended mass into the manufacturing product comprises:
   sizing fragments of cellulosic and plastic materials;
   delivering a specified ratio of cellulosic and plastic materials to a forming system;
   organizing the cellulosic and plastic materials into a formed mass;
   introducing additives that when reacted bind the formed mass yielding a solidified mass; and
   shaping the solidified mass into ridged and non-ridged two-dimensional and three-dimensional shapes.

5. The method of claim 4, wherein blends of cellulosic and plastic materials are organized into a single mass.

6. The method of claim 4, further comprising introducing energy into the formed mass to facilitate melting and flowing of a plastic portion of the formed mass, wherein once the plastic portion is deenergized, the plastic portion solidifies and binds the formed mass.

7. The method of claim 6, wherein melting the plastic portion comprises energizing the formed mass as the formed mass is pressed in one or more presses, passed through an extruder under pressure, passed through an injection molder under pressure, introduced to a heated mold and cast.

8. The method of claim 7, wherein the formed mass is cast using a roto former or blown into a mold under pressure.

9. The method of claim 4, further comprising introducing energy into the formed mass to facilitate melting and flowing of a plastic portion of the formed mass that once deenergized solidifies and binds the formed mass.

10. The method of claim 4, wherein shaping the solidified mass into ridged and non-ridged two-dimensional and three-dimensional shapes is done by pressing, extruding, casting, injection molding, roto forming, blow molding, or pouring.

11. The method of claim 1, further comprising applying a covering to one or more sides of the manufacturing product.

12. The method of claim 4, wherein creating the manufacturing product comprises:
adding a bonding agent to the formed mass; and
pressing the formed mass with one or more presses included in the forming system.

13. The method of claim 12, further comprising binding the formed mass into a rigid or semi rigid form of a two-dimensional article or a three-dimensional article by passing the pressed formed mass through an extruder, injection molder, roto former, or casting the material.

14. The method of claim 4, wherein the engineered plastic and cellulose elements added to the municipal solid waste include recyclable cellulose-based materials, recyclable plastics, aseptic packaging, virgin plastic-based materials, and virgin cellulosic materials.

15. The method of claim 1, further comprising shredding municipal solid waste, residuals from municipal recycling facilities, and post-industrial waste.

16. The method of claim 1, further comprising shredding a plastic portion of the waste including reducing a size of the waste to particle sizes ranging between 0.088 mm and 254 mm.

17. The method of claim 1, further comprising shredding a cellulosic portion of the waste including reducing a size of the waste to particle sizes ranging between 0.088 mm and 254 mm.

18. The method of claim 1, further comprising adding an additive to the blended mass, the additive being selected from a group consisting of a biocide, sealing agent, flame retardant, a water repellant, a bonding agent, a combining agent or any combination thereof.

19. The method of claim 1, further comprising conveying the blended mass to a forming system.

20. The method of claim 19, further comprising, prior to the conveying, drying municipal solid waste in a dryer; densifying the municipal solid waste in a densifier; and pelletizing the municipal waste.

21. The method of claim 20, wherein pelletizing the municipal waste is done using a pelletizing press, a pelletizer or pelletizing the municipal waste through filament extrusion.

22. The method of claim 4, wherein the two-dimensional or three-dimensional article exhibits a physical property selected from the group consisting of fire resistant, hydrophobic, impact resistant, mold resistant, shock resistant, and any combination thereof.

23. The method of claim 4, wherein the two-dimensional or three-dimensional article is selected from the group consisting of a flat or planar sheet, a box, a shipping container, furniture, signage, construction product, and any combination thereof.

* * * * *